Feb. 15, 1955   O. V. MONTIETH   2,702,100
BRAKE FOR PROPELLER DRIVES
Filed April 1, 1950   2 Sheets-Sheet 2

Inventor
Oscar V. Montieth
By Willits, Helwig & Baillio
Attorneys

United States Patent Office
2,702,100
Patented Feb. 15, 1955

2,702,100
BRAKE FOR PROPELLER DRIVES

Oscar V. Montieth, Indianapolis, Ind., assignor to General Motors Corporation, Detroit, Mich., a corporation of Delaware Application April 1, 1950, Serial No. 153,361

8 Claims. (Cl. 188—110)

This invention relates to aircraft propeller drives and more particularly to a braking system for aircraft propellers.

The invention is illustrated in conjunction with a contra-rotating dual propeller drive gear. The propellers are driven by a single engine shaft which drives the sun gear of a planetary gear train which positively drives the propellers in opposite directions. The sun gear meshes with planet pinions mounted on a spider connected to one propeller shaft. The planet pinions mesh with a ring or orbit gear fixed to the other propeller shaft. To prevent differential action the planet pinion has an auxiliary pinion rotating therewith and meshing with a ring gear fixed to the casing. Thus there is a positive gear connection between both propeller shafts and the drive shaft and a brake applied to one of these shafts would act on all of them. The propeller brake can then be connected by step-up gearing to the outer propeller shaft. The brake has a normally fixed conical drum which is engaged by a conical shoe. A spring constantly urges the shoe into engagement with the drum and fluid pressure generally from the oil pump holds the brake in released position when the engine is operating. In order to release the brake before starting a source of auxiliary pressure is connected to the fluid actuating member to release the brake.

A primary object of this invention is to provide, in a direct aircraft propeller drive mechanism, a brake to prevent the wind-milling of the propellers when they are feathered.

Another object of the invention is to provide in a propeller braking mechanism a spring-operated brake, wherein the brake shoe is spring-pressed into engagement with the drum during relative rotation in one direction, and where the brake is self-energized and cam-actuated for increased braking during relative rotation in the other direction.

Another object of the invention is to provide in a propeller drive mechanism a spring-actuated brake which is normally held in released position by power generated by the power plant for the propeller engine, and is held in released position for starting by an auxiliary power plant.

These and other objects of the invention will be apparent from the following drawings and specification which is illustrative of a preferred form of the invention.

In the drawings—

Figure 1:
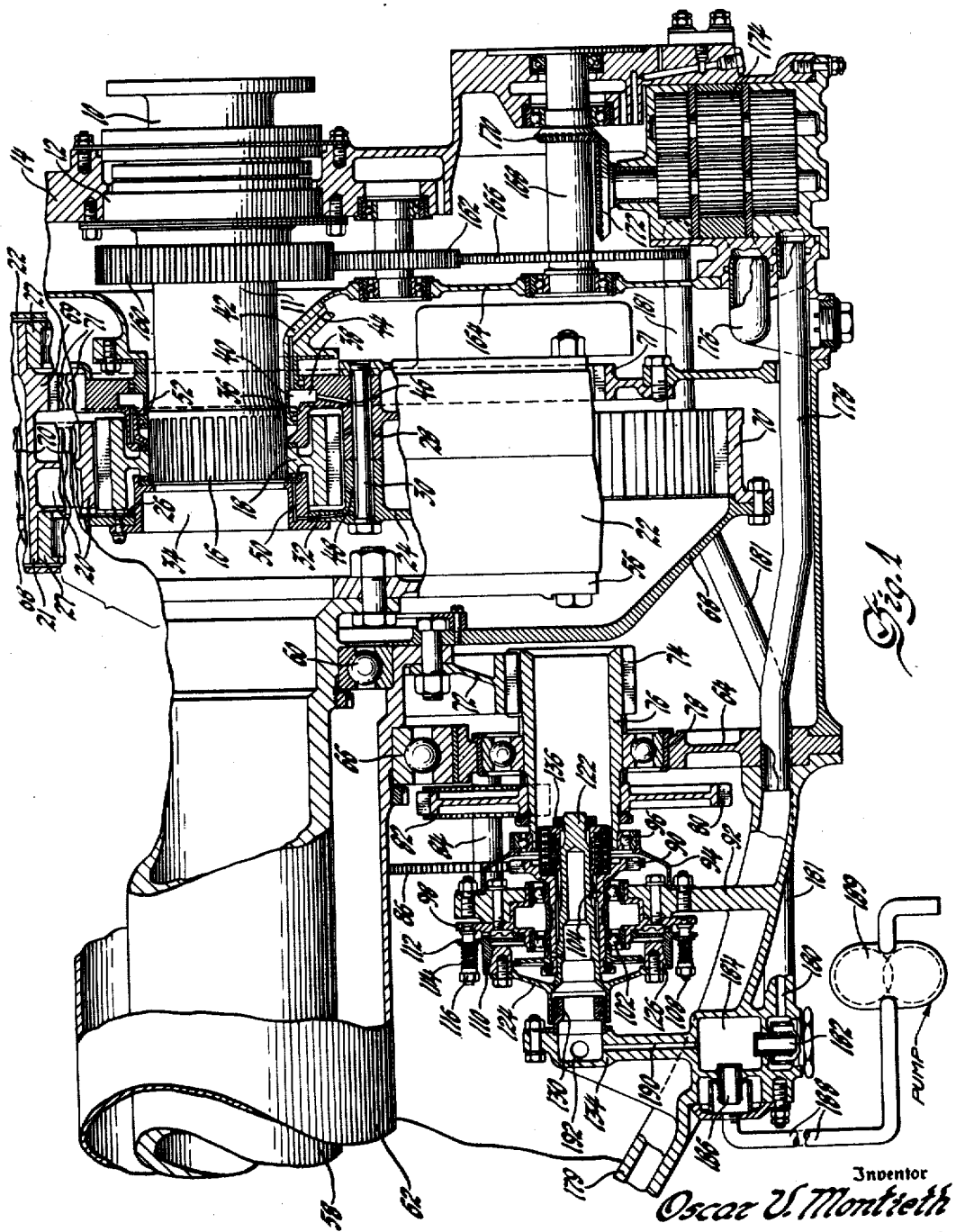
Figure 1 is a fragmentary sectional view of a dual propeller drive and reduction gear with the brake.

The invention as illustrated in the drawings is employed in a propulsion system having a contra-rotating dual propeller driven by one engine unit. The drive shaft 10 is connected to a power plant, generally of the internal combustion type, and is mounted in a bearing 12 secured in the gear housing 14. The shaft 10 has an end portion 11 which may be a separate element secured to shaft 10 or an integral portion of shaft 10. The portion 11 has splines 16 at the end thereof on which the sun gear 18 is mounted. The spline 16 is of the floating type to allow axial movement of the sun gear 18 which is restrained by the planet carrier or spider 22.

The gear 18 meshes with a plurality of planet gears 20 fixed to a shaft 21 partially shown at the top of Figure 1 and mounted on the spider 22. The spider 22 has an inwardly extending supporting frame 24 having hollow portions 26 for the gears 20. The walls of spider 22 at each side of gears 20 have bearings 27 for shaft 21. The spider has central solid portions 28 between the gears 20 to provide a base for the bolts 30 and oil passages. The spider 22 is recessed at 32 throughout the solid portions 28 to provide clearance for the sun gear 18. The recess is closed at one side by a flange 34 which is secured to the inner edge of the spider 22 and has sealing engagement with one side of the hub of gear 18. At the other side the inner edge of the spider has an integrally extending flange 36 which extends into contact with the other side of the hub of the gear 18 to provide a closed chamber surrounding the gear 18.

The spider 22 has an annular oil recess 38 which mates with an annular groove 40 in a fixed portion 42 of the casing. Lubricating oil from pump 174 or any central source is supplied by a pipe which is not shown in this section to the passage 44 which communicates with the grooves 40 and 38. From the groove 38 the oil flows through a suitable main passage 46 and is distributed to the gear by the passages 48 and to one flange seal by the passage 50 illustrated below the center of shaft 11, and to the other flange seal by the passage 52 illustrated above the center of shaft 11.

The spider 22 is mounted on an annular supporting plate 56 which is secured to the end of the inner propeller shaft 58. The inner propeller shaft is mounted in ball bearing 60 which is secured inside the outer propeller shaft 62. The two propeller shafts are mounted concentrically and rotate in opposite directions, and are supported in bearing 66 which is secured in partition 64 of the gear-box 14. The shaft 58 is connected to the forward propeller and the shaft 62 to the aft propeller of a pair of oppositely rotating propellers.

The outer shaft 62 has an annular radially and axially offset flange 68 at the end thereof. This flange surrounds the spider 22 and supports the annular or ring gear 70 which meshes with the planet gears 20 of the reduction gear drive. In order to prevent differential movement between the two propellers the planetary gearing is connected to the casing 14. An auxiliary planetary gear 69 is positioned on each planetary gear shaft 21. This auxiliary gear 69 meshes at the outer side of spider 22 with a fixed ring gear or auxiliary orbit gear 71 which is secured to the housing 14 as shown in the lower portion of Figure 1.

A brake gear 72 is also attached to this end of the outer propeller shaft 62. The gear 72 meshes with a pinion 74 on the brake shaft 76 which is mounted in the bearing 78 secured in an aperture in the supporting partition 64. Adjacent the partition 64 a gear 80 is secured to the shaft 76. The gear 80 meshes with a pinion 82 on a countershaft 84 supported in partition 64 and support 92 and displaced behind the brake mechanism as shown in Figure 1. The countershaft has a gear 86 driving the braking sleeve pinion 90. The brake mechanism is mounted on a support 92 which has an open bearing support 94 which supports the bearing 96 for the end of the brake shaft 76.

Figures 2, 3:
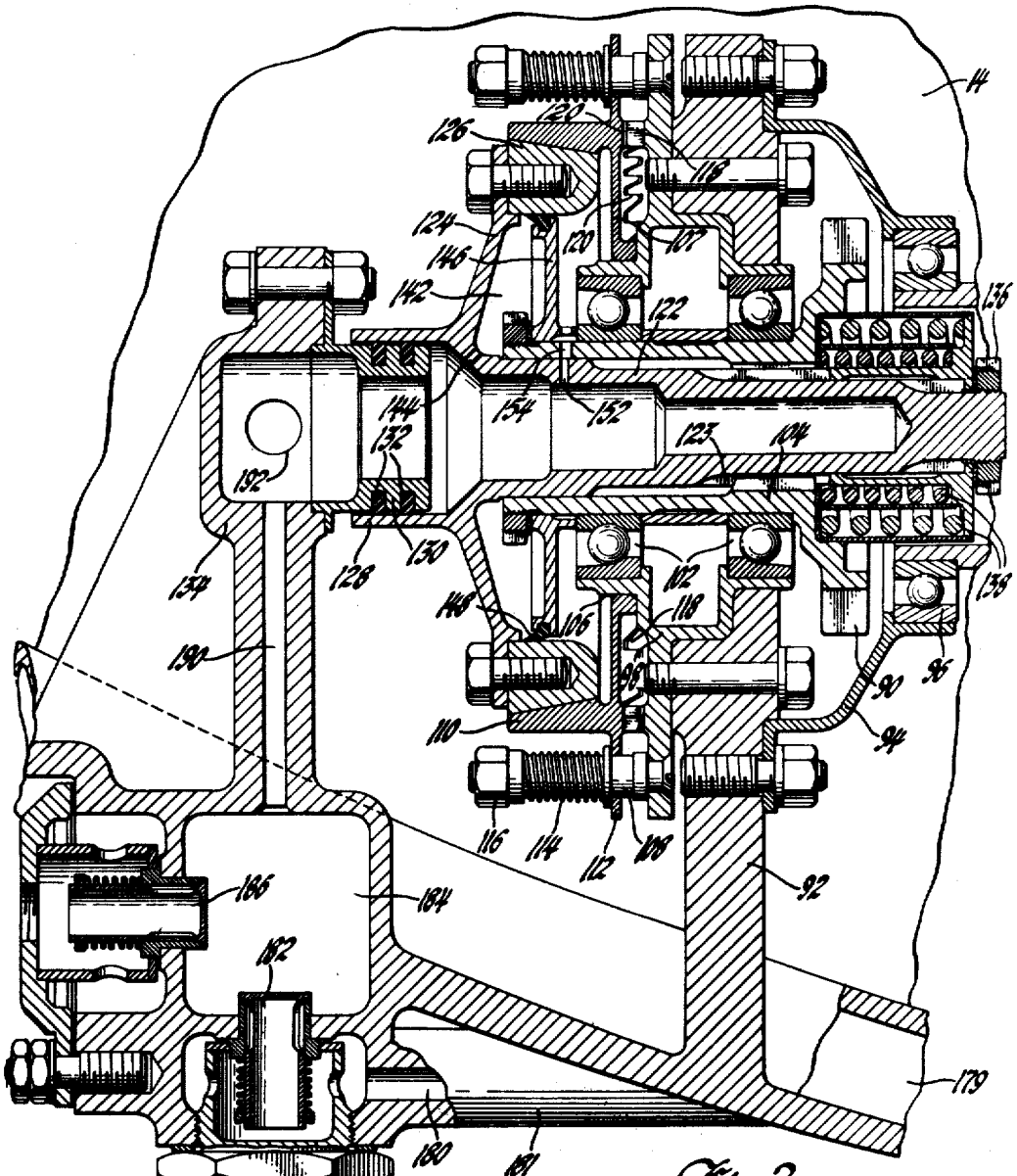
Figure 2 is an enlarged fragmentary sectional view of the brake.
Figure 3 is an enlarged fragmentary developed view of a detail.

The support 92 has a central aperture to receive a bearing support and cam member 98. The bearing support member 98 has flanges at each side to support the bearings 102 for the brake sleeve 104 which is driven by the pinion 90. The central support 98 has a cylindrical guide portion 106 which is slidably engaged by the central flange 107 of the brake drum 110 in order slidably support the brake drum 110 concentric with sleeve 104. A series of pins 108 are secured about the perimeter of the support member 98 to limit the rotational movement of the conical brake drum 110. The pins 108 engage the drum 110 by passing through an elongated slot in the flange 112. Coil springs 114 positioned around the pins 108 and held in position by an abutment or nut 116 engage the flange 112 and urge the drum to slide toward the support member 98. The support member 98 has a series of cams 118 and the brake member has an interengaging and complementary series of cams 120 illustrated in Figure 3, so that relative rotational movement of the brake drum 110 with respect to the support 98 will produce axial displacement between the members and compress springs 114.

A brake drum tube 122 is mounted within the brake sleeve 104 and the tube and sleeve have interengaging splines 123 to prevent relative rotation but allow axial sliding. The tube 122 has annular flange 124 constituting a brake disc to support the frustro-conical brake shoe 126. The brake tube 122 has an enlarged cylindrical portion 128 adjacent the brake shoe supporting flange 124 which is slidably mounted about a hydraulic connector 130 of cylindrical form which has suitable seals 132. The hydraulic connector 130 is suitably secured to a support portion 134 of the housing 14. The central passage in the brake tube 122 is closed at the other end and an abutment or spanner nut 136 is secured thereto. A dual coil spring 138 is compressed between the abutment 136 and the end of the sleeve 104 to bias the brake shoe toward braking position.

The hollow center of the brake tube 122 is connected to the piston chamber 142 by means of a passage 144. The piston chamber has a back wall 146 consisting of an annular plate secured to the brake sleeve 104 and sealed to the inner cylindrical surface of the conical brake shoe 126 by a rubber seal 148. Aligned oil passages 152 in the tube 122 and oil passage 154 in the sleeve 104 allow oil to flow to the brake for cooling when the brake is in or near the applied position.

The engine driven shaft has a gear 160 secured thereon just inside the housing 14. The gear 160 meshes with idler 162 which is mounted in suitable bearings in the gear housing 14 and the partition 164. The idler 162 drives gear 166 which is mounted on shaft 168 which is also supported in suitable bearings in the gearbox 14 and the partition 164. The shaft 168 has a bevel gear 170 secured thereon which meshes with a bevel gear 172 which drives the multiple-bank gear pump 174. The inlet pipe 176 of the gear pump terminates in a strainer portion located in the lower part or sump of the gear housing 14. A forward pipe 178 extends from the gear pump forward through the sump portion of gear housing 14 and through the partition 64 to a passage 179 in the forward end of the housing. This inlet passage opens into the forward end of the housing to scavenge the oil when the housing is inclined such as in a dive. A pump outlet pipe 181 extends across the housing 14 and is connected with a bored oil passage 180 in the gear housing beneath the brake. The passage 180 leads to a one-way or check valve 182 through which oil may flow to the chamber 184. A check valve 186 positioned in a conduit 188 leading from an auxiliary source of fluid pressure, such as pump 189, is positioned in another wall of the chamber 184. A passage 190 leads from the chamber 184 to the connector 130 in order to supply oil to the brake mechanism. If two brakes are required to supply sufficient braking torque, a second duplicate brake may be employed and connected to the hydraulic system by passage 192.

The power plant which may consist of one or more engines is connected to the shaft 10 and drives the sun gear 18 of a planetary type dual propeller reduction drive. One propeller is mounted on the inner sleeve shaft 58 which is driven by a spider supporting the planetary gears 20 which mesh with the sun gear 18. A second propeller is mounted on the external sleeve shaft 62 which is connected to the annular ring gear or orbit gear 70 which meshes with the gears 20.

The planetary gears have auxiliary gears rotating on the same shafts mounted on the spider connected to shaft 58. The auxiliary gears mesh with a fixed orbit gear or ring gear mounted in the gear housing so that the planetary gearing provides a positive contra-rotating drive for the dual propellers.

The brake mechanism is connected to the outer sleeve shaft 62 by a series of step-up gearing starting with the gear 72 fixed to shaft 62 and driving the aligned brake shaft 76 by meshing with pinion 74. The drive continues through gear 80 fixed to the shaft 76 which drives a countershaft pinion 82 mounted on countershaft 84. From the countershaft the drive is transferred from gear 86 to pinion 90 which drives the brake sleeve. Thus the brake rotates at many times the speed of the propeller shaft and the braking force necessary to stop the propellers is reduced. In this design the brake rotates about 30 times faster than the propeller.

In normal operation this gear drive rotates with the outer propeller shaft. The brake shoe which is mounted on the brake tube 122 is held in released position by fluid pressure generated by the oil pump 174 during the normal operation of the propeller drive. The oil is supplied from the pump through pipe 181, passage 180 and check valve 182. From the check valve the oil enters the chamber 184 and flows up through the connector 130 to the hollow interior of the tube 122 which is slidably mounted in the sleeve 104. The oil flows through aperture 144 and enters the chamber 142 creating a pressure against the fixed backing plate 146 and the brake flange 124 and moves the conical brake shoe 126 and the brake tube assembly 122 to the left compressing the springs 138.

When there is engine failure and it is necessary to feather and stop the propellers, the pump 174 ceases to pump fluid to the brake cylinder or chamber 142 to hold the brake in released position. Then the spring 138 operates and pulls conical shoe 126 into contact with the brake drum 110. The oil escapes from the operating cylinder 142 through holes 152 and 154 and by leakage past the seal 148, by leakage past ring seals 132, by leakage through the clearance between sleeve 104 and tube 122. When the shoe 126 is just about to engage the drum 110, the aperture 152 in the brake tube 122 and aperture 154 in the brake sleeve 104 come into alignment and allow oil to flow between the wall 146 and the flange 107 to the braking surfaces for cooling. This oil will fall into the housing 14 and return to the sump. If the propeller tends to rotate in the normal direction, the ratchet cams 118 and 120 lock and prevent relative rotation of the brake drum 110 and the support member 98. Then the brake is merely actuated by the spring 138. However, if the propeller tends to rotate in a reverse direction and thus rotates the brake shoe 126 in reverse direction, the shoe would drag the drum 110 in this direction, and the cams 118 and 120 will ride up on each other and the drum will be forced away from the support 98 to further increase the braking pressure and thus the braking effect. When the reverse rotation ceases the springs 114 will return the brake drum 110 to the normal position.

In order to start the engine which may be of the internal combustion engine type such as a gas turbine, this propeller brake must be released. This is accomplished with an independent source of fluid pressure, such as auxiliary pump 189, which is connected to the conduit 188. In starting the engine the auxiliary pressure is built up until it opens the check valve 186 and enters the chamber 184. The check valve 182 will remain closed or be closed so that oil flow to the oil pump 174 will be prevented. Thus the independent oil flow will move upward through the connector 130 and passage 144 to the cylinder 142 to release the brake. As the engine is started the oil pump 174 will create a pressure sufficient to open check valve 182 and close check valve 186 and maintain the brake in released position. The independent source of fluid pressure may then be cut off.

The above described embodiment is illustrative of the invention which is subject to many modifications within the scope of the appended claims.

Certain structure disclosed but not claimed in this application is disclosed and claimed in the applications, of common ownership with this application, of Victor W. Peterson for Propeller Drives, Serial No. 231,465, filed June 14, 1951 (a continuation-in-part of abandoned application Serial No. 128,427 filed November 19, 1949) and of William R. Bain for Propeller Brake System, Serial No. 171,741, filed July 1, 1950.

I claim:
1. In an aircraft engine drive, a propeller drive shaft, a first pump connected to said drive shaft, a propeller brake connected to said drive shaft to stop said drive shaft, hydraulic means to release said propeller brake, a first check valve, fluid supply means from said first pump connected to said hydraulic means through the first check valve, an auxiliary pump capable of supplying hydraulic fluid when said drive shaft is not rotating, a second check valve, a second fluid supply means from said auxiliary pump connected to said hydraulic means through the second check valve, said first check valve blocking exhaust of fluid from the hydraulic means through said first pump and said second check valve blocking exhaust of fluid from the hydraulic means through said auxiliary pump.

2. In an aircraft engine drive, propeller drive means, a propeller connected to said propeller drive means to normally rotate said propeller when said drive means is rotated, a propeller brake having a fixed part and a rotary part, means connecting said propeller drive means to said rotary part to rotate said rotary part about thirty times the speed of said propeller drive to reduce the amount of force required to stop the propeller rotation, and brake applying means cooperating with said fixed part and said rotary part to stop said rotary part and said propeller.

3. In an aircraft engine drive, a support, propeller drive means, a brake member mounted for rotation and axially fixed in the support and connected to said propeller drive means, a brake drum mounted for rotary and axial movement on said support, means on said drum and support preventing rotation in one direction and allowing limited rotation in the other direction with axial movement, a tube slidably mounted in said member and in rotary driving relation thereto, a brake disc cooperating with said brake drum supported on the tube, means between said member and said disc to form a chamber therebetween, and fluid pressure supply means connected to said chamber.

4. In an aircraft engine drive, a propeller drive shaft, a propeller connected to said propeller drive shaft, power take-off means connected to said drive shaft, a propeller brake connected to said drive shaft, means to release said propeller brake, connecting means connecting said power take-off means to said release means to release said propeller brake, auxiliary power means to supply power when said propeller drive shaft is not rotating, connecting means connecting said auxiliary power means to said brake release means to release said brake when said propeller drive shaft is not rotating, and means in said connecting means to disconnect said auxiliary power means from said brake release means operated by said power take-off means being effective to release said propeller brake.

5. In an aircraft engine drive, a support, propeller drive means, a brake member mounted for rotation and axially fixed in the support and connected to said propeller drive means for rotation therewith, a brake drum mounted for rotary and axial movement on said support, means on said drum and support preventing rotation in one direction and allowing limited rotation in the other direction with axial movement, a tube slidably mounted in said member and in rotary driving relation thereto, a brake disc supported on said tube for cooperation with said drum, spring means between said tube and said member to move said brake disc toward said drum, means between said member and said disc to form a chamber therebetween, and fluid pressure supply means connected to said chamber to retract said brake disc from said drum.

6. In an aircraft engine drive, a support, propeller drive means, a brake member mounted for rotation and axially fixed in the support and connected to said propeller drive means for rotation therewith, a brake drum mounted for rotary and axial movement on said support, means on said drum and support preventing rotation in one direction and allowing limited rotation in the other direction with axial movement, a tube slidably mounted in said member and in rotary driving relation thereto, a brake disc supported on one end of said tube for cooperation with said drum, spring means between the other end of said tube and said member to move said brake disc toward said drum, means between said member and said disc to form a chamber therebetween, and fluid pressure supply means connected to said chamber to retract said brake disc from said drum.

7. In an aircraft engine drive, a support, propeller drive means, a brake member mounted for rotation and axially fixed in the support and connected at one end to said rotary drive means for rotation therewith, a brake drum mounted for propeller and axial movement on said support, means on said drum and support preventing rotation in one direction and allowing limited rotation in the other direction with axial movement, a tube slidably mounted in said member and in rotary driving relation thereto, a brake disc supported on one end of said tube, spring means between the other end of said tube and said member adjacent said drive means to move said brake disc toward said drum, means between said member and said disc to form a chamber therebetween, and fluid pressure supply means connected to said chamber to retract said brake disc from said drum.

8. In an aircraft engine drive, a support, propeller drive means, a brake member mounted for rotation and axially fixed in the support and connected at one end to said propeller drive means for rotation therewith, a brake drum mounted for rotary and axial movement on said support, means on said drum and support preventing rotation in one direction and allowing limited rotation in the other direction with axial movement, a tube slidably mounted in said member and in rotary driving relation thereto, a brake disc supported on one end of said tube, spring means between the other end of said tube and said member adjacent said drive means to move said brake disc toward said drum, and means acting on said brake disc to retract said brake disc from said drum.

References Cited in the file of this patent

UNITED STATES PATENTS

| | | |
|---|---|---|
| 1,561,722 | Jimerson | Nov. 17, 1925 |
| 2,144,423 | Caldwell | Jan. 17, 1939 |
| 2,304,560 | Freeman | Dec. 8, 1942 |
| 2,482,460 | Browne | Sept. 20, 1949 |

UNITED STATES PATENT OFFICE
CERTIFICATE OF CORRECTION

Patent No. 2,702,100                                                        February 15, 1955

Oscar V. Montieth

It is hereby certified that error appears in the printed specification of the above numbered patent requiring correction and that the said Letters Patent should read as corrected below.

Column 6, line 22, for "rotary" read --propeller--; line 23, for "propeller" read --rotary--.

Signed and sealed this 17th day of May 1955.

(SEAL)
Attest:

E. J. MURRY
Attesting Officer

ROBERT C. WATSON
Commissioner of Patents